E. J. DELANEY.
COMBINED HOSE-CART, REEL, AND IRRIGATOR.

No. 184,956.  Patented Dec. 5, 1876.

Witnesses
Geo H Strong
Jno. L. Bone

Inventor
Edward J. Delaney
Dewey & Co.
Attys

UNITED STATES PATENT OFFICE.

EDWARD J. DELANEY, OF SAN JOSÉ, CALIFORNIA.

IMPROVEMENT IN COMBINED HOSE-CART, REEL, AND IRRIGATOR.

Specification forming part of Letters Patent No. 184,956, dated December 5, 1876; application filed September 28, 1876.

*To all whom it may concern:*

Be it known that I, EDWARD J. DELANEY, of San José, county of Santa Clara, and State of California, have invented a Combined Hose-Cart, Reel, and Irrigator; and I do hereby declare the following to be a full, clear, and exact description thereof, reference being had to the accompanying drawings.

My invention relates to carts for transporting garden-hoes; and it consists, first, in providing an arrangement by which the rotation of the axle can be made to rotate the reel for the purpose of winding up the hose when desired; and, secondly, to a novel arrangement by which I am able to convert the carriage into a standing irrigator.

Figure 1:
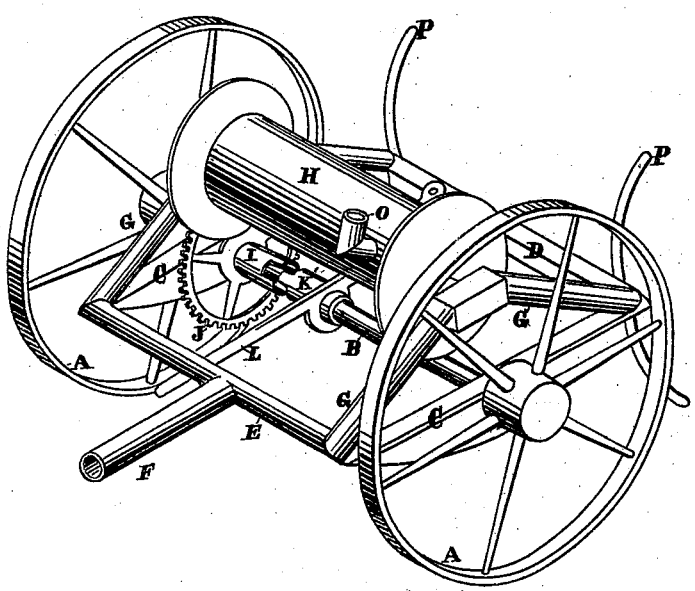
Figure 2:
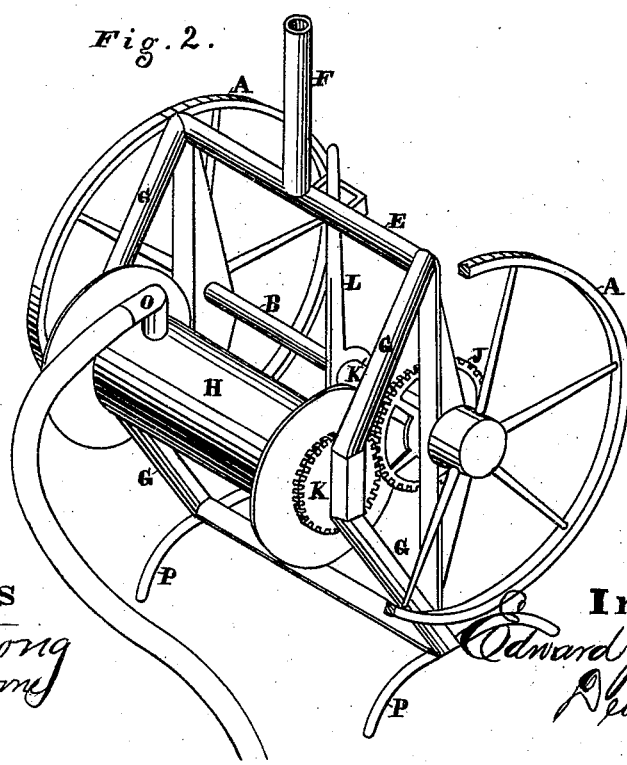

Referring to the accompanying drawings, Figures 1 and 2 are perspective views of my invention.

A A are the wheels of a hand-cart, such as is used for transporting garden-hose. These wheels are connected by the axle B, to the extremity of which they are permanently secured, so that the wheels and axle rotate together. I then construct a square frame, the sides C C and rear end D of which I make of angle-iron, while the front rail E and the pole or tongue F are made of metal tubing. This frame I then mount upon the axle B by suitable means, so that the axle will revolve freely under the frame. In the present instance I have made the downward-projecting flanges of the angle-iron sides C C wide enough to allow the axle to pass through them. Upon each side of this frame I construct a support for the reel, by securing two short bracing-tubes, G G, together at their upper ends, and extending them at an angle from each other, so that their opposite ends will rest on the extremities of the sides C C. The reel H is suspended between the upper connected ends of these side braces, as represented.

Inside of one of the sides C of the frame I place a sleeve, I, loosely upon the axle, the inside end of which is formed into a half-clutch; and upon this sleeve I secure a toothed wheel, J, which engages with a toothed wheel, K, on the end of the reel, so that the axle can rotate freely inside of the sleeve I without rotating the reel.

A clutch, K', is arranged to slide on a feather on the axle B, and is operated by a lever, L, so that the clutch can be connected with the clutch end of the sleeve I, thus communicating the motion of the axle to the reel, so that the hose can be wound upon the reel without handling it manually.

Near one end of the reel I secure a tubular elbow or pipe, O, to which one end of the hose is attached or coupled. This tube or elbow connects, through the reel and journal-bearing of the reel, with the front tubular brace G. This brace is connected with the front tubular rail E, and the front rail connects with the tubular pole. I thus close or block up the rear tubular brace G in rear of the front brace, and I also block up the front rail on the opposite side of the pole, so that I get a communication from the nozzle through the frame and pole. I then attach a nozzle to the end of the pole, so that I can use the cart as a standing irrigator; and to adapt it for this I provide feet P P at the rear of the frame, so that the frame can be tilted backward and allowed to rest upon the feet, with the pole and nozzle pointing upward, thus converting the cart into a standing irrigator.

When the frame is thus tilted, so as to stand on the feet P, the wheels will be supported clear of the ground, so that by connecting the clutch K with the sleeve I, and turning either of the wheels, the hose can be wound upon the reel without shifting its position.

I thus provide a combined hose-cart, automatic winding-reel, and standing irrigator, which will be quite convenient for gardens, lawns, and other places which require irrigation.

Having thus described my invention, what I claim, and desire to secure by Letters Patent, is—

1. The wheels A A, connected by the axle B, in combination with the frame, consisting of the angle-iron sides C C, angle-iron rear rails D, and front tubular rail E, bracing-tubes G G, and reel H, substantially as and for the purpose described.

2. The hose-reel H, mounted on a cart, and provided with the toothed wheel K, in combination with the loose sleeve I on the axle, with its toothed wheel J, and the sliding clutch K', operated by the lever L, substantially as and for the purpose described.

3. The reel H, provided with the short tube O, said tube being connected by a water-passage through the reel and cart-frame, with the tubular pole F, in combination with the feet P on the rear end of the cart-frame, substantially as and for the purpose described.

In witness whereof I hereunto set my hand and seal.

EDWARD J. DELANEY. [L. S.]

Witnesses:
　ALBERT SCHRODER,
　YGNACIO SCHRODER.